May 18, 1965
A. C. PETERSON
3,183,661
AIR AND FUEL CHARGING MEANS FOR FOUR CYCLE
ENGINES OF MONO-VALVE TYPE
Filed Nov. 8, 1961
2 Sheets-Sheet 2
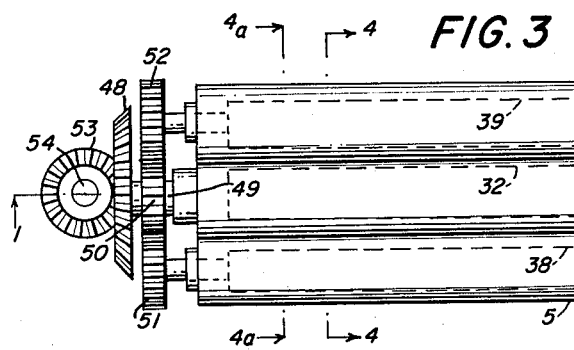
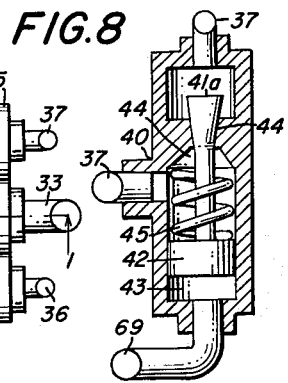
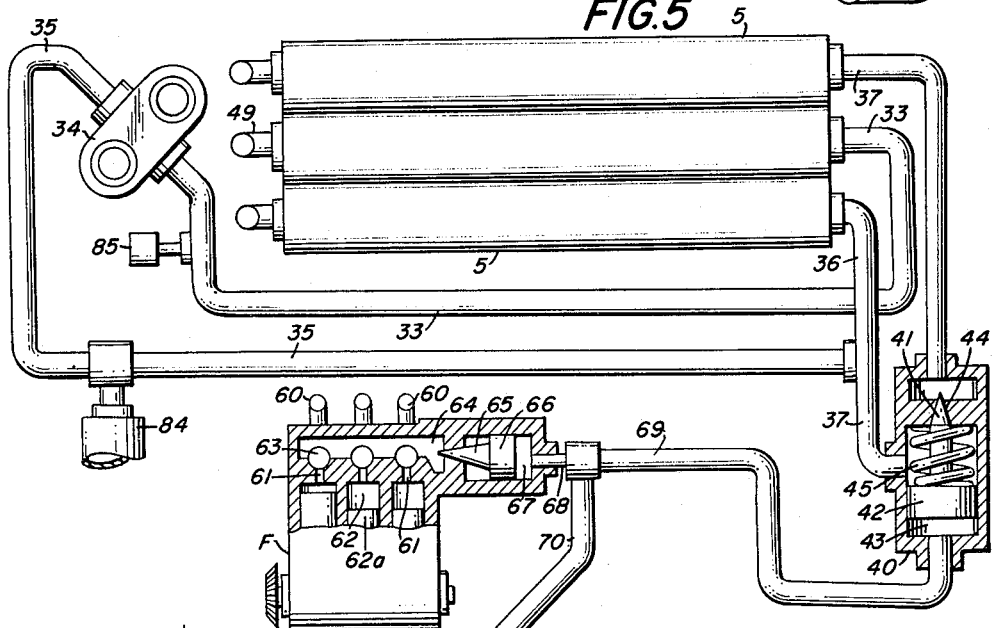
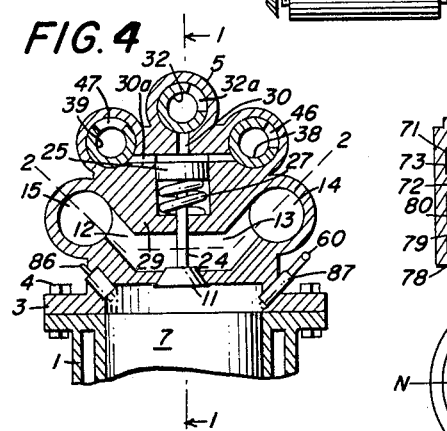
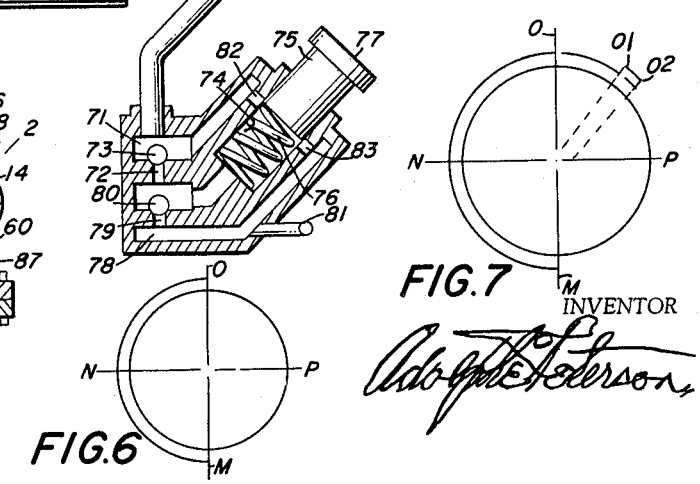
INVENTOR United States Patent Office 3,183,661
Patented May 18, 1965

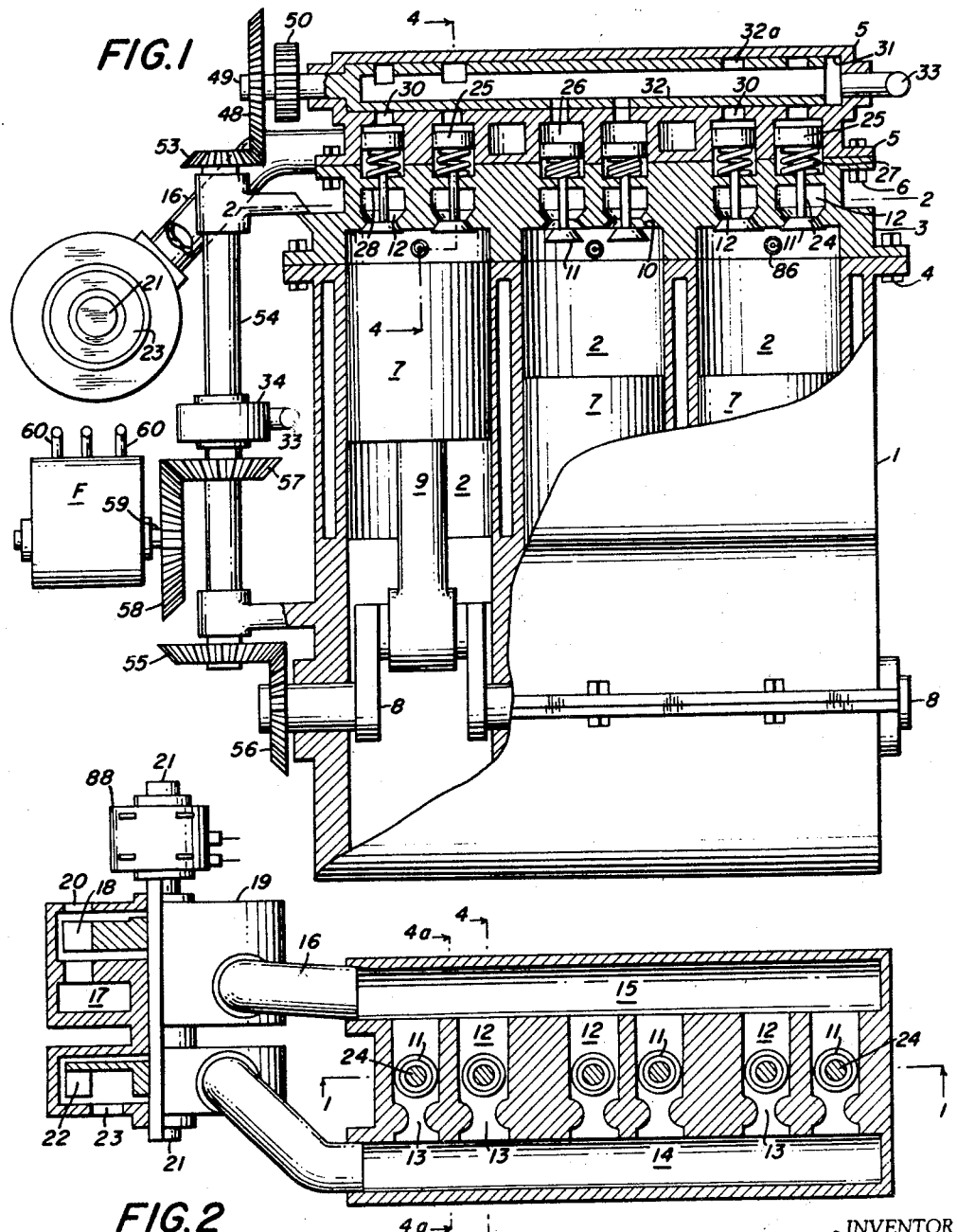

3,183,661
AIR AND FUEL CHARGING MEANS FOR FOUR-CYCLE ENGINES OF MONO-VALVE TYPE
Adolphe C. Peterson, 4623 Bruce Ave. S.,
Minneapolis, Minn.
Filed Nov. 8, 1961, Ser. No. 150,956
10 Claims. (Cl. 60—13)

My invention relates to internal combustion engines and especially to such engines as are sometimes called the mono-valve engine, and related also to other improvements in connection with the use of mono-valve systems, and it is called Air and Fuel Charging Means for Four-Cycle Engines of Mono-Valve Type.

The chief objects of my invention are to provide an internal combustion engine which shall be somewhat simpler in relation to its power output and efficiency, and to provide a construction in connection therewith which shall result in a more economically constructed and operated or maintained engine. Heretofore there have been and tried certain engines of a mono-valve type, but such engines have not been successful as such mono-valve type engines for the reason that they have not been so designed that they could properly accomplish the functions which they were intended to accomplish. The present invention is designed as a means to effect a proper design of such a mono-valve engine so that this type of charging for internal combustion engines of the four-cycle type will accomplish the objects of such a design in such manner that the engine will have the necessary effectiveness as such an engine and so that it will be efficient in performance, effective in engine charging with fresh air and fuel for the air, and especially so that it will not have the deficiencies which such engines have had in the past and which have prevented their adoption for general use in the industry.

An object is also to provide in connection with this design of engine or type of engine a valve operating and control means which enable the valve means and fuel means to provide an efficient combustible charge of the proper proportions for effective and efficient combustion and economical use. An object is to provide a valve operating means for this type of engine which shall not be too complicated for application and use in this type of engine while securing the necessary effectiveness. An object is also to provide effective super-charging in connection with the mono-valve type of engine, and also to provide effective increased valve port area in each cylinder so that as a result of all such improvements and features the resulting engine will have proportionally better power and at less cost per unit of power than such engines as have usually been designed. An important characteristic of such mono-type engines of the past has been that there is comingling of exhaust and air gases so that there is not effective charging and this especially is not a disadvantage of this improved design. In general the object is to improve upon the design and especially to reduce the cost per unit of power in four-cycle engines of the internal combustion type.

The principal devices and combinations of devices comprising my invention are as hereinafter described and as more particularly defined in the claims. In the accompanying drawings which illustrate my invention like characters refer to like parts throughout the several views. Referring to the drawings:

FIGURE 1 is a vertical section through the axial centers of the cylinders and crank shaft of a three-cylinder four-cycle engine embodying my invention, the section being on the lines 1—1 of FIGURES 2, 3, 4, some parts being broken away and some parts being shown in full side elevation.

FIGURE 2 is a horizontal section (with reference to engine block) on the lines 2—2 of FIGURES 1 and 4, the turbo-compressor being shown partly in section on an individual line through the axis of the rotating shaft thereof.

FIGURE 3 is a plan view of the engine block shown in FIGURES 1, 2, and 4, this plan view particularly showing the valve operating valve construction and its driving gear means, other parts not being shown, some being broken away.

FIGURE 4 is a vertical section at right angles to that of FIGURE 1 and being transversely of the valve means of one engine cylinder and the valve means for valve operation control, in part broken away, on lines 4—4 and 4a—4a of FIGURES 2, 3.

FIGURE 5 is in general a diagrammatic view to show the valve operating and control system in clearer illustration and incidentally to this there are shown a fuel pumping means and a control for the air valve control means and a manual control which determines the control of the air charge means and the fuel charge means, the fuel pumping means being such as is shown in the patent issued to this applicant and which is hereinafter designated.

FIGURES 6 and 7 are diagrammatic cycle defining views, FIGURE 7 being of a modified cycle which may be used instead of that defined in connection with FIGURE 6. FIG. 8 shows a modified unit 40.

The embodiment of my invention as is illustrated is one which utilizes the mono-valve type of charging in a dual form, that is with two such mono-valve charging means for each cylinder of the engine. This illustration of the dual mono-valve construction is not intended to limit the construction to a dual valve use per cylinder but is merely illustrative of the fact that the operating control means may be used with two of such mono-valve type valves and ports for each cylinder as such use may increase the effectiveness and this may be done with a single control valve means. That is to say, that the invention is applicable to use of only one mono-valve valve means and port means for each cylinder of an engine, the other means being similar in construction, except that not as many ports would be necessary in the control valve means. The term control valve or means is used in designation of the control operating means for the main valves, that is the charging valves of the engine. The common control means is a term which is applicable to the means for the combined or unified control of the air charging and fuel charging means.

The engine construction in general comprises the cylinder block 1 wherein cylinders 2 are formed, and the cylinder head block 3 wherein the valve means for control is in part contained, the latter being secured to the former by bolts 4, and also the control valve block 5 which is secured to the cylinder head block by means of the bolts 6. The cylinders 2 are the combustion cylinders wherein will reciprocate the engine or power pistons 7 which drive the engine crank shaft 8 by means of the connecting rods 9. The cylinder head block 3 contains and has formed in it the charging ports 10 wherein are stationed when closed the mono-valves 11 which are charge port valves. The charging ports 10 are between the associated cylinder 2 and an associated air or gas passage 12, the term gas designating a fluid which is air or exhaust gas or exhaust gas and air. There are two of the gas passages 12 for each combustion cylinder 2, that is, there is one such passage 12 associated with and independently related to each charging port 10. Each gas passage 12 is associated with an individual air channel 13 which is between the associated gas passage 12 and a super-charging air conduit 14 which is generally designated as a common air conduit 14. Each air channel 13 has a restricted cross-sectional area less than that of its associated gas passage. This, plus a high super-charged inlet air pressure, keeps a pressure higher than that of the exhaust gas passage constantly in air conduit 14 to prevent back flow.

The gas passages 12 all discharge into a common gas conduit 15 which conveys the mixed exhaust gas and air flow to a single connecting conduit 16 and thereby to the inlet chamber 17 of a turbine rotor 18 which rotates in turbine casing 19 and discharges the gases to atmosphere by ports 20.

The turbine rotor 18 drives the rotor shaft 21 and thereby drives a centrifugal compressor rotor 22 and the latter inducts air by the ports 23 and after compression discharges the air to the common air conduit 14. The pressure at which the compressor operates will be that which is found to be most efficient for the particular construction but it should be approximately that pressure which will serve to always in operation maintain a pressure of air in the common air conduit 14 which is sufficient to maintain constantly the flow of air through the individual air channels 13 and this pressure may be only ten pounds per square inch but may in some constructions be sufficient so that the pressure is always even as much as thirty pounds per square inch in the conduit 14. The discharge of gases to the common gas conduit 15 should be so free and the discharge through the turbine rotor 18 should be free so that gas pressure in channels 12 will be somewhat below that of the pressure in common air conduit 14 but so that difference of pressures at maximum power operation need be only one or two pounds or even less. Electric motor 88 is a supplemental drive for shaft 21.

The charge port valves 11 each has a valve stem 24 and each of these has at its upper end a small piston or plunger 25 this being just large enough so that it may function under the pressures maintained in the valve operating fluid as hereinafter described. Each piston 25, which may be called a pressure responsive element, is reciprocable in an associated small cylinder 26 formed as shown in part in the cylinder head block and in part in the control valve block 5 the piston being slidable however in the upper end of that cylinder, there being in the lower end (of each such cylinder) a small coil spring 27 which is compressed between the lower end of the piston 25 and the lower bearing 28 for the valve stem. A port 29 permits release of pressure in the lower end of the cylinder 26 but the piston 25 should fit so well that there is only the slightest leakage, if any.

Each cylinder 26 at its upper end may receive a fluid such as a lubricating oil of low viscosity, or according to the construction, a gaseous fluid as air, through an associated port 30 in the wall of a bore 31 of elongated form but small in diameter which is formed in the top end of the control valve block 5 and in which there is rotatable an elongated cylindrical control valve 32, this latter valve being designated also as a pressure fluid valve. The latter has a bore into which the lubricating oil or other operating fluid may flow from a conduit 33. The conduit 33 receives the operating fluid from a gear type or Roots type pump or compressor means 34, the latter receiving the fluid from a return conduit 35 which receives the returning operating fluid from either of two branch conduits 36 and 37, the former receiving the fluid from a so-called complete or final discharge valve 38, and the latter receiving the returning fluid (part of it at times) from a control discharge valve 39 there being however interposed in the conduit 37 a pressure control unit 40 wherein there is located a needle valve or small control valve for operating fluid designated 41, this latter being connected with a pressure responsive piston or plunger 42 reciprocable in small cylinder 43 and normally moved to open the control port 44 by means of the coil spring 45. This means serves to control pressure in the control discharge valve 39 so that there may be no discharge by the control discharge valve 39 or so that there may be some discharge as controlled by the valve 41, and as further hereinafter stated. The final discharge valve 38 has a port 46 for each charge port valve 11, that is to discharge from the associated cylinder 26. The control discharge valve 39 has a port 47 for each cylinder 26. Valve 32 has ports 32a.

The pressure fluid valve 32 is rotated by a bevel gear 48 and has fixed on its shaft 49 a spur gear 50 which drives the two spur gears 51, 52, individually on valves 38 and 39 respectively. The bevel gear 48 is driven by bevel gear 53 on vertical shaft 54 and the latter is driven through bevel gears 55 and 56 by the engine crank shaft 8, the drive being such that each of the valves 32, 38, 39 is driven at a speed which is one-half that of the engine crank shaft 8 so that the cycle for four cycle operation of the engine is maintained.

The vertical shaft 54 has fixed thereon a bevel gear 57 which drives a larger bevel gear 58 the drive being such that the shaft 59 of the fuel pumping or plunger unit F is driven at a speed corresponding to that of the valves 32, 38, 39, that is at one half the speed of the engine crank shaft 8. The fuel plunger unit F is contemplated to be made in accordance with any suitable system for fuel injection to engine cylinders and any suitable system for control of such fuel delivery and charges by injection, but it is here shown as being the type of such means which is shown and claimed in the patent of this applicant which is designated as Patent Number 2,851,953, dated Sept. 16, 1958, entitled Fuel Measuring Distribution and Control Means. Plungers (or pistons) 62a are reciprocable one in each plunger cylinder 62.

The fuel plunger unit F delivers fuel by independent fuel lines 60, these being of the same number as the number of combustion cylinders in the engine on which the device is established, this being three in the present construction illustrated. The unit F has discharges 61 from each plunger cylinder 62 each of which is restricted as to return flow by its related ball valve (or any type valve) 63, the delivery of all discharges 61 being to the common release conduit 64, and the latter has discharge as controlled by a release needle valve 65, the latter being in turn pressure controlled by a pressure responsive member (piston) 66 against which there is the pressure of the lubricating oil or other fluid of the system control means, that is the means by which there is manual control of the air charging and the fuel charging so that there is the required proportioning of the fuel charges to the air charges. The fluid last described is delivered to or released from the chamber 67 by means of conduit 68.

A conduit 69 connected with the cylinder 43 of unit 40 provides for flow to and from cylinder 43 and to provide the pressure against plunger 42. The two conduits 68 and 69 are branches from a common conduit 70 and the latter connects with a chamber 71 to which there may be flow of the manual control fluid by port 72, the non-return valve 73 being interposed, from the manual pump chamber 74 as pumped therefrom by the manual pump 75, the later being moved outwardly by coil spring 76 and inwardly by the manually contacted member 77, that is by either hand or foot of a driver or pilot. The pump chamber 74 receives the fluid from chamber 78 through port 79 in which there is interposed the non-return valve 80 and the chamber 78 may be supplied in any manner with fluid by the conduit 81. The chambers 71 and 78 may be in communication to release fluid from chamber 71 and thereby from conduits 68, 69, 70, by means of the two ports 82, 83 in the wall surrounding the pump 75, this communication being such that the release of fluid occurs when pump 75 is released to its maximum outward position. The fluid in this manual pump system may be either liquid or gaseous as is desired in a particular construction.

As has been described, there are two control fluid systems, one being that by which the air charging valves 11 are operated, and the other being that by which there is manual (or other) control of the air charging system and the fuel charging system, the former being generally designated "mono-valve operating means," the latter being generally designated "charge control means."

The control of the air charging may be by either of two cycles as is shown respectively by the two diagrams, the one in FIGURE 6 and the other in FIGURE 7, and these will be described in connection with the general operation description hereinafter.

The combustion cylinders operate on a cycle which is substantially that of a four-cycle internal combustion engine in that there is in each cycle two rotations of the engine crank shaft 8, that in one of those rotations there is during the inward stroke of the engine piston exhaust of exhaust gases, that in the next downward or outward stroke of the engine piston there is induction of both air and fuel (not simultaneously however), that in the next inward stroke there is compression of the charge, and that in the next outward stroke there is expansion of the working charge to produce the working energy of the engine.

The mono-valve operation means functions as follows to effect air charging and exhaust of the engine cylinders: The circuit of the valve operating fluid comprises flow of the fluid such as lubricating oil from conduit 35 through the pumping (or compression) means 34 to conduit 33, thence to the interior bore of valve 32, thence as controlled by ports 32a in valve 32 to passages 30, thence to the upper end of cylinders 26 as selected and in sequence, thence outwardly from cylinders 26 to the complete discharge valve 38 and control discharge valve 39 according to the control thereof, thence to the conduits 36 and 37 according to the control, thence again to the intake of the pumping means 34. Fluid may be supplied as may be necessary from a fluid reservoir 84. The pumping means 34 should be of a large enough capacity to supply the required fluid at a sufficient pressure, and a safety valve 85 may limit the pressure to that which is determined to be a sufficiently high pressure.

The complete dscharge valve ports are such as to effect a complete discharge approximately at the end of the induction stroke of an engine piston (according to cycle as in FIGURE 6), and the control valve discharge is such as to effect a partial discharge or slow complete discharge according to the control of unit 40 or to permit no discharge through the control valve discharge, discharge being then only by the complete discharge valve 38. The function of the control discharge valve is to provide further control of the pressure acting on piston 25 and thus effect the timing of valves 11. The change of pressure on piston 25, according to the control thereof, may effect degree of port opening as well as length of the period of port opening, as is otherwise explained herein.

The pressure of fluid in the control discharge valve 39 is determined by the pressure in the cylinder 43 of unit 40 which pressure acting on piston (or plunger) 42 against coil spring 45 determines the position of the needle valve 41 and the degree of opening of the control port 44 and accordingly the rate of flow from the control discharge valve 39 or whether there is any flow therefrom at all. If there is flow through the control port 44 there will be some release of fluid from control discharge valve 39 and from each cylinder 26 during each cycle when the associated cylinder 2 is inducting air. The less pressure in control discharge valve 39 the greater will be flow from the cylinders 26 and the earlier and more will be the closing of each of the charge valves 11 during the induction stroke of a piston 7. Thus the permitted air charge flowing to each combustion cylinder 2 will be controlled and may be less or greater according to the control pressure in the control discharge valve 39. The pressure in control cylinder 43 is according to that in conduit 69 and that will be later explained.

Referring to FIGURES 1 and 2 it will be seen that the turbine 18 is driven by exhaust gases from exhaust conduit 15 (a common exhaust conduit), that air compressor 22 is thereby driven and that compressed air will flow through common air conduit 14 and will flow therefrom in small divisional streams through the restricted flow air channels 13 and issuing therefrom at slightly higher pressures than the pressure of exhaust gases in gas passages 12 will flow in constant stream over the ports controlled by charge valves 11 and during exhaust periods will carry exhaust gases therewith and during induction periods will flow as air through ports 10 to combustion cylinders 2. The constant flow of air at a pressure higher than pressure immediately above the valves 11 ensures that the space immediately above each valve 11 is cleared of exhaust gases immediately at completion of exhaust stroke of a piston 7 and that accordingly there is air and only air above the ports 10 and entering ports 10 when the associated valves 11 are open.

The gases flowing from gas passages 12 to exhaust conduit 15 are at a relatively high heat and expanded and thereby provides the driving energy for the turbine 18. It should be noted that any additional driving means may in any particular construction be provided to provide greater driving power to the compressor rotor 22. Such means as commonly used in engines are such means as electric motors, crank shaft driven gear means. Such means might provide the additional driving power at periods such as starting periods. Such means are commonly known and are not therefore especially shown, as the functioning of the air and gas stream would be similar.

The fuel unit F and its drive is arranged to provide an injection to each engine cylinder 2 during the period in which there is compression of the air in the combustion cylinder 2 and it may be early or late in that compression period but will in any case be arranged to provide each individual injection after the associated valve 11 has closed. As is described in the patent to this applicant which is above identified, the quantity of fuel injected at each injection is determined by the quantity of fuel release and that is determined by the pressure in the release conduit 64 which in turn is controlled by the pressure in the conduit 68 and thereby on fuel control piston 66.

The charge control means determines the pressures in the conduits 68 and 69 which is the pressure in the conduit 70 and the chamber 71. The pressure in chamber 71 is that effected by a driver's or pilot's manual reciprocation of plunger 75, the pressure increasing as it is reciprocated without release of fluid through ports 82–83, and diminishing when there is such release by release of plunger 75 (by the driver) and accordingly flow through ports 82–83 to chamber 78. Since there is a common pressure applicable at all times to conduits 68 and 69 and thus upon control pistons 42 and 66, there will be a proportional effect upon the control of both fuel charging and air charging to combustion cylinders 2 and the power output of the engine is thus variable.

Referring now to FIGURE 7, this is a modified cycle of the control by means of the control valve 41 and the control discharge valve 39. In this modified cycle the control discharge valve 39 by its ports 47 and their relative cooperation with passage 30a is arranged so it does not permit fluid retarding in flow to any of cylinders 26 during an induction period of the associated combustion cylinder 2 but so that it instead, while under the control of the pressure of fluid in the valve 39 in manner as in the first form, may permit flow during the initial part of the compression period in a combustion cylinder 2 thus permitting some of the inducted air to flow outwardly from the combustion cylinder. The length of the period and the relative closing of the valve 11 will depend upon the rate of flow through the control port 44 in unit 40. But air flow will be completely discontinued at an early period in the compression stroke. In such a modified form the complete discharge valve 38 will be modified in the design, as its function will then be performed later in the cycle of the discharge valve 38. In this modified cycle, the greater the pressure is in pipe 69 and on control piston 42, the more will the control valve 41a be unseated from its seat in unit 40 and accordingly the more easy and quick will be discharge from control discharge valve 39 so that not so much, if any, inducted air will be discharged from a combustion cylinder 2 or finally so that there will be no air discharge from cylinder 2 in the initial part of the compression stroke in a cylinder 2. Thus the greater the pressure in conduit 69 the more complete and full in quantity will be the air charge in each combustion cylinder 2 when compression commences.

The unit 40 will in the modified cycle of the engine control means be formed as is shown in the FIGURE 8 which shows the modified form of the control valve, in this form designated 41a, and its modified action. In this form the control valve 41a is arranged so that it will gradually close the aperture 44 and finally seat therein when the pressure lessens on the control piston 42 and that will be when fuel supply to the cylinders 2 is decreased, and in this condition the charge valves 11 will be kept open longer in the open cycle, that is each valve 11 in its individual cycle will not close as quickly in the cycle so that accordingly valves 11 will permit more air discharge in the compression initial period. On the other hand when the control valve 41a is kept open by pressure on the control piston 42 (maximum pressure) there will then be discharge of fluid from cylinders 26 in the period when the compression stroke begins and is effected and the ports 10 will be closed in the initial part of the compression stroke as well as in the later part of the compression stroke and accordingly there will be no discharge of air in the compression stroke from cylinders 2 and no loss of air and consequently a larger charge of fuel per cycle may be combusted.

But to effect this modified cycle, the ports in complete discharge valve 38 are so arranged that, by such ports, no discharge of fluid from cylinders 26 will be permitted until a period which is at that when one-half of the compression stroke in a cylinder 2 is completed, this exact time being determined in any construction according to power necessary for idling action. Likewise the ports in control discharge valve 39 will be so arranged that discharge to that control discharge valve 39, when permitted, will be during the initial part of the compression stroke in any cylinder 2.

The difference in the control cycles may be better understood by a detailed description of the cycles in respect to the FIGURES 6 and 7. Referring first to FIGURE 6, the circle is diagrammatically illustrative of one complete cycle of one combustion cylinder 2, that is there are four quarters, designated by radii, M to N—the exhaust stroke, N to O—the induction stroke, O to P—the compression stroke, P to M—the combustion and working stroke; these four quarters including two rotations of the engine crank shaft 8.

The semi-circular line in FIGURE 6 designates that portion of a combustion cycle of a cylinder 2 when the cylinder's valves 11 (or valve 11) may be held open for, first exhaust, and second for induction of air. According to the action of control discharge valve 39 by its associated port there may however be complete discharge or some discharge of the control fluid from the associated cylinder 26 so that the valve 11 may partially close or completely close if there is free discharge, and such discharge by control discharge valve 39 will be controlled by the driver or pilot and will be in such quantity that the air induction to the cylinder 2 will be in proportion to the quantity of fuel injected to cylinder 2 according to the coincident control of the fuel injection system. In this form, the first described, and according to cycle as in FIGURE 6, the valve 11 will not be open in the compression stroke and all the air which has been permitted to be inducted (according to control) will be subject to compression in the compression stroke, the quarter from O to P in FIGURE 6.

Referring now to FIGURE 7, the four quarters similarly designate—exhaust, induction, compression, expansion or working strokes. The semi-circular line and its extension to $O^1$ designates the period during which there may be movement of gases or air through the port controlled by the valve 11. Flow through the port 10 will be as controlled by the control discharge valve 39 so that, while there is flow at all the period between M and O, there may or may not be flow during the period from O to $O^1$, there being then flow through port 10 according to degree of opening of port 10 by valve 11 this being according to quantity of release of control fluid from the associated cylinder 26 by control discharge valve 39, during the period O to $O^1$. The quantity of air permitted to remain in the cylinder 2 will therefore in this form depend on the release of control fluid by control discharge valve 39 during the period from O to $O^1$. However, if the valve 39 has not permitted full discharge of control fluid from cylinder 26 so valve 11 has completely closed, then in the period from $O^1$ to $O^2$, the complete discharge valve 38 by its associated port permits free discharge from the associated cylinder 26 so the valve 11 completely closes. Thus by the full discharge at the period designated by radius $O^2$ the compression stroke (or portion thereof) commences definitely, if it has not commenced before that period $O^1$ to $O^2$. By this cycle as designated by FIGURE 7 and as just described, movement through port 10 is free at all times, but there may or not be movement of air from cylinder 2 during the period O to $O^1$ and thus the proportioning of the charge of air is effected, in this form of cycle, by the control of valve 11 during the initial portion of the compression stroke.

Each cylinder 2 has a spark ignition plug 86, which is controlled for ignition as such means is generally controlled and such means is therefore not illustrated further. Each cylinder 2 receives injection of fuel by fuel injection nozzle 87, such injection being at any time during the period O to P (approximately) in FIGURE 6 and at any time during the period $O^2$ to P (approximately) in the form of cycle as in FIGURE 7.

The means which I have illustrated as means to procure the actuation of valves 11 according to the described form and cycle, is an illustrative means as means for such purpose, it being contemplated that any means effecting control as has been described in the cycle described and for the purpose as described, may be used instead, the form shown being an effective form for the purpose.

It should be noted that in the design of the first form regarding the timing of the control discharge valve 39 and its ports, with reference to the strokes of an associated piston 7, there should be enough lag in the opening of discharge from a cylinder 26 that there will at least be enough induction of air for the support of the combustion necessary for idling of the engine, and that ports in the valves 32, 38, 39 should be of such exact and similar flow capacity for the respective control cylinders 26, that the valve operating action, associated with all cylinders 2 will be substantially similar in the actuation effectiveness and result upon the combustion cylinders 2. It should be especially noted that the effect of the air compression by means of the exhaust turbine drive and air compression rotor driven thereby is to so increase the pressure of air in the channels 12 during the air charging period that the flow of exhaust gases away from ports 10 and flow of air into cylinders 2 by ports 10 is so positively induced that air charging with clean air is more certainly accomplished and that in conjunction therewith there is the possibility that the air charges may be so comparatively increased that the engine cylinders 2 may combust more fuel and more effectively so that power output is increased per cubic inch of cylinder capacity for engine cylinders 2, and that the effectiveness and utility of a mono-valve type of engine is thereby considerably bettered. And in particular it may be noted that any type of valve control means which will effect the control as necessary of air flow is contemplated to be utilizable with the design of my invention. The design of the restrictive effect upon air in restricted air channels 13 is such in connection with the increased pressure effective by the turbine driven air compression that there is positive flow over valve ports 10 and clean air is inducted for the compression of air charges.

I have shown three control valves 32, 38, 39, but it is contemplated that the design may be such that one such valve or two may accomplish all the functions of control by any suitable arrangement of conduits for the same result. It should be noted that the effect of variation of flow of the control fluid from cylinders 26 is not only to vary the relative area of the valve ports 10 but also, according to the control, to vary the actual comparative length of time in which the valve ports 10 are open, in each cycle, and that thus the effective flow is variable as may be necessary or desired.

While I have shown detailed devices and combinations of devices in the illustration of my invention, I contemplate that other detailed devices and combinations of devices may be used in the realization of my invention without departing from the scope and intention of my invention.

What I claim is:

1. In an internal combustion engine having in each cylinder a power cycle which includes in sequence, exhaust, air charging, compression and expansion; a plural number of cylinders and a plural number of pistons, each cylinder having at least one piston reciprocable therein; a plural number of divisional flow passages at least one adjacent to and in association with each cylinder, each divisional flow passage having an entrance end and a discharge end; the said divisional flow passages having each a restricted flow capacity and such divisional flow passages having each thereof flow capacity substantially similar; a plural number of ports at least one for each cylinder and between it and an associated divisional flow passage; a plural number of port valves each port valve in association with one said port to open or close it; a means for operation of said valves in cyclic order coordinated with reciprocation of the pistons in said cylinders to open each said port for a period included in the power cycle of the associated cylinder during which there may be in sequence flow of exhaust gases out of the cylinder to said associated flow passage in the exhaust stroke and flow of air from the associated divisional flow passage and into the cylinder in the induction stroke; an air compressing means inducting air and discharging the air under compression in a plural number of streams one stream to each said divisional flow passage at one end thereof; means driving said air compressing means; the said air compressing means having an air induction and compressing capacity such as in operation to maintain higher pressure in the discharge from said air compressing means to said entrance ends than in said divisional flow passages and to maintain substantially continuous flow through each said divisional flow passage to prohibit reversal of directional flow therein; means to cyclically and periodically inject fuel to air charging each said cylinder, injection of fuel occurring for each charge of air to a cylinder in a period subsequent to exhaust flow from the cylinder: the said means for periodic operation of said port valves being further defined as; a pressure responsive element for each port valve and interconnected therewith a fluid pressure supply means, means operating said fluid pressure supply means in cyclic coordination with the reciprocation of said pistons to effect opening of said port valves each from its said port during a period of each of the cycles of combustion in a cylinder including a preceding exhaust period for gas exhaust from the cylinder and a succeeding induction period in which there is air induction and control means for said pressure fluid supply means to effect relative shortening or lengthening of the period during which there may be flow between a cylinder and its associated divisional flow passage.

2. In charging means for combustion engines: a combustion cylinder and a reciprocating piston therein; a flow passage adjacent the cylinder for flow of gaseous fluid therethrough and a port in the head end of the cylinder providing passage between the flow passage and the combustion cylinder for flow either way from one to the other; a valve for said port and means in operative interconnection with the piston in its reciprocation to procure cyclic actuation of the valve in coordination relation with reciprocation of said piston to open said port valve from said port in one phase during which there may be in sequence exhaust flow from the cylinder through said port to said flow passage in an exhaust stroke and subsequent flow of air from said flow passage to said cylinder in an induction stroke and to close said port valve on said port in an alternate phase during which there may be in sequence compression and expansion in said cylinder; an air compressing means inducting air from atmosphere and discharging air to an entrance end of said flow passage and means to drive said air compressing means; a discharge from a discharge end of said flow passage; means to relatively shorten or lengthen the phase during which there may be flow between said flow passage and said cylinder through said port; means to deliver fuel to said cylinder during a phase of the cycle of charging and combustion in said cylinder; means to coordinate quantitative fuel charging of said cylinder with air charging per cycle by flow between said flow passage and said cylinder.

3. The device as defined in claim 2 and: the cooperation and coordination between actuation of said port valve and reciprocation of said piston being such that the relative opening of said port in the phase of air induction and air compression is reduced or increased to reduce or increase relative volume of air retained for compression in said cylinder.

4. In charging means for combustion engines: combustion cylinders and cooperating reciprocating pistons at least one in each cylinder: flow passages each in association with one cylinder and adjacent thereto for flow of gaseous fluid therethrough; ports one in the head end of each cylinder providing passage between the flow passages associated and the combustion cylinder for flow either way from one to the other; valves one for each said port and means in operative interconnection with the pistons in their reciprocation to procure cyclic actuation of the valves in coordination with reciprocation of the pistons to open each said port valve from its associated port in one phase during which there may be in sequence exhaust flow from the cylinder through said port to said flow passage in the exhaust stroke and subsequent flow of air from said flow passage to the associated cylinder in an induction stroke and to close said port valve on said port in an alternate phase during which there may be in sequence compression and expansion in said associated cylinder; an air compressing means inducting air from atmosphere and discharging air to entrance ends of sad flow passages; a discharge means from the discharge ends of said flow passages; means to relatively reduce port opening or increase port opening in the phases during which there may be flow between any flow passage and its associated cylinder through an associated port; means to deliver fuel to each of said cylinders during phases of the cycles of charging and combustion in a cylinder; gaseous fluid driven motor means receiving gaseous fluid from said discharge means and actually interconnected with said air compressing means to drive it; the said motor means and said air compressing means effecting maintenance of pressure in said flow passages above that of atmospheric pressure of ambient air.

5. The device as defined in claim 4 and: the means delivering fuel to said cylinders incorporating means to proportion the quantity of such fuel delivery to the air charge of each power cycle to the volumetric quantity of air delivery for such air charges.

6. The device as defined in claim 4 and: the means for delivery of fuel having in cooperation therewith means for adjustment of the volumetric delivery of fuel in each power cycle of each cylinder; a pair of pressure responsive means one interconnected actuably with the means adjusting the relative opening of the ports for air flow between each cylinder and its associated flow passage, one interconnected actuably with the means adjusting the relative volumetric delivery of fuel per power cycle to each cylinder; and a common fluid pressure supply and control means therefor to which each of said pressure responsive means is responsive.

7. The device as defined in claim 4 and: the said means to procure cyclic actuation of the valves being further defined as a plural number of pressure responsive elements each interconnected with one of said valves, a fluid pressure supply means, means controlling said fluid pressure supply means to procure cyclic coordination of supply to said pressure responsive elements and release of said fluid pressure therefrom with reciprocation of said pistons to effect opening of said valves from their ports during a period of each power cycle of the associated cylinder including a preceding exhaust period and a succeeding period for air flow between the flow passage and the cylinder.

8. In charging means for combustion engines: engine cylinders and reciprocating pistons at least one in each engine cylinder; a charge port to each cylinder a port valve for each charge port, a fluid responsive element for each port valve interconnected therewith to move it for opening and closing of the port; a fluid pressure chamber for each pressure responsive element and to which the latter is associated; a rotary valve means actuable in cyclic cooperation and relation with reciprocation of said pistons; a pressure fluid supply, pressure fluid passages controlled by said rotary valve means and by which the pressure fluid may flow to said fluid pressure chambers in selective and cyclic manner, control release passages controlled by said rotary valve means and by which pressure fluid may be released from said chambers, discharge passages controlled by said rotary valve means and by which there may be pressure discharge from said chambers.

9. The device as defined in claim 8 and: the said control release passages being all connective with a common release conduit, the common release conduit having a common discharge and means to control said common discharge.

10. In an internal combustion engine having in each cylinder a power cycle which includes in sequence, exhaust, air charging, compression, expansion; a plural number of cylinders and a plural number of pistons, each cylinder having at least one piston reciprocable therein; a plural number of divisional flow passages at least one adjacent to and in association with each cylinder; the said flow passages having each a discharge end for exhaust from the flow passage and having each an entrance end for intake of air and having each a restricted flow capacity at its entrance end and entrances to flow passages having each thereof flow capacity substantially similar; a plural number of flow ports at least one for each cylinder and between it and an associated flow passage and permitting flow between the flow passage and the cylinder at the location between entrance and discharge; a plural number of port valves each port valve in association with one said flow port to open or close it; a means for operation of said valves in cyclic order coordinated with reciprocation of the pistons in said cylinders to open each said flow port for a period included in the power cycle of the cylinder during which there may be in sequence flow of exhaust gases out of the cylinder to said associated flow passage in the exhaust stroke and flow of air from the associated flow passage and into the cylinder in part of the period including induction and compression; an air compressing means inducting air and discharging the air under compression in a plural number of streams one stream to each said flow passage at the entrance end thereof; means driving said air compressing means; the said air compressing means having an air inducting and compressing capacity such as in operation to maintain air pressure at said entrance ends higher than flow pressure subsequently in the flow passages and to maintain substantially continuous flow of gaseous fluid in each flow passage to its discharge to prohibit reversal of directional flow therein; means to cyclically and periodically inject fuel to air charging each said cylinder, injection of fuel occurring for each charge of air to a cylinder in a period subsequent to exhaust flow from the cylinder; and means to control the flows of air and fuel to procure the proportioning of air and fuel in charging cyclically of each cylinder to maintain proportioning for substantially efficient combustion and power production.

References Cited by the Examiner
UNITED STATES PATENTS

| | | | |
|---|---|---|---|
| 877,194 | 1/08 | Holzwarh | 123—90 X |
| 1,405,235 | 1/22 | Levin | 123—79 |
| 1,473,077 | 11/23 | Bull | 123—90 |
| 2,105,699 | 1/38 | Pate | 123—79 |
| 2,710,521 | 6/55 | Nettel | 60—13 |
| 2,977,943 | 4/61 | Lieberherr | 123—51 |
| 3,015,934 | 1/62 | Miller | 60—13 |

JULIUS E. WEST, *Primary Examiner.*

ROBERT R. BUNEVICH, EDGAR W. GEOGHEGAN,
*Examiners.*